(12) United States Patent
Horita et al.

(10) Patent No.: US 11,671,524 B2
(45) Date of Patent: Jun. 6, 2023

(54) MOBILE DEVICE

(71) Applicant: SEIKO EPSON CORPORATION, Tokyo (JP)

(72) Inventors: Ryohei Horita, Nagano (JP); Nobuaki Ito, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 172 days.

(21) Appl. No.: 16/942,810

(22) Filed: Jul. 30, 2020

(65) Prior Publication Data

US 2021/0037124 A1 Feb. 4, 2021

(30) Foreign Application Priority Data

Aug. 1, 2019 (JP) .............................. JP2019-142073

(51) Int. Cl.
*H04M 1/00* (2006.01)
*H04M 1/02* (2006.01)
*H02J 7/00* (2006.01)
*H01M 10/0585* (2010.01)

(52) U.S. Cl.
CPC ..... *H04M 1/0262* (2013.01); *H01M 10/0585* (2013.01); *H02J 7/007* (2013.01); *H02J 7/0047* (2013.01); *H02J 7/0063* (2013.01); *H01M 2220/30* (2013.01)

(58) Field of Classification Search
CPC .......... H04M 1/0262; H01M 10/0585; H01M 2220/30; H01M 10/48; H01M 2010/4271; H01M 10/0562; H01M 2300/0065; H01M 10/052; H01M 10/42; H01M 10/486; H02J 7/0047; H02J 7/0063; H02J 7/007; Y02E 60/10; Y02P 70/50

USPC ........................................................ 455/571
See application file for complete search history.

(56) References Cited

U.S. PATENT DOCUMENTS

| | | | | |
|---|---|---|---|---|
| 5,183,716 A | * | 2/1993 | Nakacho | H01M 10/052 429/315 |
| 5,350,993 A | * | 9/1994 | Toya | H02J 7/00047 320/106 |
| 5,850,134 A | * | 12/1998 | Oh | H01M 10/46 320/106 |
| 5,912,544 A | * | 6/1999 | Miyakawa | H02J 7/0031 320/152 |
| 6,014,008 A | * | 1/2000 | Hartzell | H02J 7/00047 320/106 |
| 6,809,649 B1 | * | 10/2004 | Wendelrup | H02J 7/00047 340/636.11 |
| 7,426,405 B2 | * | 9/2008 | Lee | H02J 7/00047 455/575.1 |
| 7,492,121 B2 | * | 2/2009 | Kim | H02J 7/0003 320/112 |

(Continued)

FOREIGN PATENT DOCUMENTS

JP H02-223158 A 9/1990
JP H08-242543 A 9/1996

(Continued)

*Primary Examiner* — Ryan Jager
(74) *Attorney, Agent, or Firm* — Global IP Counselors, LLP

(57) ABSTRACT

A mobile device driven based on electric power includes a connection section configured to be electrically coupled to an all-solid-state battery having a solid electrolyte, and an obtaining section configured to obtain unique information of the all-solid-state battery electrically coupled to the connection section.

10 Claims, 10 Drawing Sheets

(56) References Cited

U.S. PATENT DOCUMENTS

| | | | |
|---|---|---|---|
| 7,570,015 B2* | 8/2009 | Bansal | H02J 7/0069 320/106 |
| 7,613,924 B2* | 11/2009 | Shankar | H04L 9/0822 713/168 |
| 8,255,176 B2* | 8/2012 | Plestid | G01R 31/3646 324/426 |
| 8,594,746 B2* | 11/2013 | Guthrie | H01M 10/425 320/136 |
| 8,685,553 B2* | 4/2014 | Rich | H01M 16/006 429/433 |
| 8,868,025 B2* | 10/2014 | Ganesh | H04W 76/50 455/404.1 |
| 9,120,392 B2* | 9/2015 | Yeh | B60L 53/60 |
| 9,267,994 B2* | 2/2016 | Plestid | G01R 31/3646 |
| 9,778,050 B2* | 10/2017 | Gupta | B60W 10/08 |
| 10,326,284 B2* | 6/2019 | Long | H02J 13/0003 |
| 10,530,167 B2* | 1/2020 | Yi | H02J 7/0047 |
| 10,637,105 B2* | 4/2020 | Matsumoto | H05K 1/115 |
| 10,852,737 B2* | 12/2020 | Szubbocsev | B60L 58/16 |
| 10,942,837 B2* | 3/2021 | Vidal | G06F 11/3688 |
| 11,108,047 B2* | 8/2021 | Atienza | H01M 10/052 |
| 2005/0127867 A1* | 6/2005 | Calhoon | G06F 1/26 320/108 |
| 2005/0248311 A1* | 11/2005 | Komaki | H02J 7/0036 320/112 |
| 2006/0076924 A1* | 4/2006 | Kim | H02J 7/00047 320/112 |
| 2008/0252477 A1* | 10/2008 | Howard | H01M 10/488 340/693.1 |
| 2012/0133205 A1* | 5/2012 | Adams | H02J 7/007182 307/29 |
| 2018/0111400 A1 | 4/2018 | Tsuchimoto | |
| 2018/0337536 A1* | 11/2018 | Li | H02J 7/00304 |

FOREIGN PATENT DOCUMENTS

| | | |
|---|---|---|
| JP | 2000-350376 A | 12/2000 |
| JP | 2012-234722 A | 11/2012 |
| JP | 2016-175374 A | 10/2016 |
| JP | 2018-069463 A | 5/2018 |

* cited by examiner

FIG. 11

| BATTERY | UNIQUE INFORMATION DATA | | DETERMINATION RESULT |
|---|---|---|---|
| | MANUFACTURER | MANUFACTURING YEAR | |
| BATTERY 1 | α COMPANY | 2031 TO 2040 | RECOMMENDED |
| BATTERY 2 | α COMPANY | 2021 TO 2030 | RECOMMENDED |
| BATTERY 3 | β COMPANY | 2031 TO 2040 | RECOMMENDED |
| BATTERY 4 | β COMPANY | 2021 TO 2030 | USABLE |
| BATTERY 5 | γ COMPANY | 2031 TO 2040 | USABLE |
| BATTERY 6 | γ COMPANY | 2021 TO 2030 | USABLE |
| BATTERY 7 | δ COMPANY | 2031 TO 2040 | USABLE |
| BATTERY 8 | δ COMPANY | 2021 TO 2030 | UNUSABLE |

MOBILE DEVICE

The present application is based on, and claims priority from JP Application Serial Number 2019-142073, filed Aug. 1, 2019, the disclosure of which is hereby incorporated by reference herein in its entirety.

BACKGROUND

1. Technical Field

The present disclosure relates to a mobile device.

2. Related Art

In general, small light portable mobile devices having a driving element have been proposed. In recent years, all-solid-state batteries having a solid electrolyte have been developed as a battery to be used for such a mobile device. For example, JP-A-2016-175374 discloses, as an example of such a mobile device, a portable liquid ejecting apparatus including a lithium-ion battery having a liquid electrolyte as a battery, for example. Furthermore, JP-A-2-223158 discloses an example of an all-solid-state battery which may be used for the mobile device disclosed in JP-A-2016-175374.

The all-solid-state battery according to JP-A-2-223158 uses a solid electrolyte, and therefore, is safer than electrolytic solution batteries having a liquid electrolyte, such as general lithium ion batteries. Accordingly, the all-solid-state battery according to JP-A-2-223158 has a large degree of freedom in terms of design and manufacturing of the battery. Therefore, the all-solid-state battery having a solid electrolyte is advantageous in that a shape and characteristics suitable for usage may be obtained. In this way, since the all-solid-state battery has a large degree of freedom in terms of design and manufacturing of the battery, different batteries having the same shape and different characteristics may be distributed. However, when such different batteries having different characteristics are employed in a single mobile device, sufficient performance of the mobile device may not be attained and malfunction may occur in the mobile device depending on the employed batteries.

SUMMARY

According to an aspect of the present disclosure, a mobile device driven based on electric power includes a connection section configured to be electrically coupled to an all-solid-state battery having a solid electrolyte, and an obtaining section configured to obtain unique information of the all-solid-state battery electrically coupled to the connection section.

The mobile device may further includes a driving circuit configured to be driven based on electric power supplied from the all-solid-state battery coupled to the connection section, and a control circuit configured to control driving of the driving circuit. When the unique information obtained by the obtaining section is first unique information indicating a first battery serving as the all-solid-state battery, the control circuit may perform control such that the driving circuit is driven in a first driving state. When the unique information obtained by the obtaining section is second unique information indicating a second battery serving as the all-solid-state battery, the control circuit may perform control such that the driving circuit is driven in a second driving state different from the first driving state.

Performance of the second battery may be lower than performance of the first battery. Power consumption in the second driving state may be smaller than power consumption in the first driving state.

When the unique information obtained by the obtaining section is different from the first unique information or the second unique information, the control circuit may perform control such that the driving circuit is not driven.

The driving circuit may include a mechanical force generation section operating or displacing an object. A mechanical force generated in the second driving state may be smaller than a mechanical force generated in the first driving state.

The driving circuit may include a sound generation section generating sound. A volume of sound generated in the second driving state may be smaller than a volume of sound generated in the first driving state.

The driving circuit may include a light generation section generating light. A quantity of light generated in the second driving state may be smaller than a quantity of light generated in the first driving state.

The driving circuit may include a temperature changing section changing a temperature. A temperature change amount in the second driving state may be smaller than a temperature change amount in the first driving state.

The mobile device may further include a storage section configured to store unique information data corresponding to the unique information, and a determination section configured to determine a type of the all-solid-state battery coupled to the connection section based on the unique information obtained by the obtaining section and the unique information data.

BRIEF DESCRIPTION OF THE DRAWINGS

FIG. 11 is a diagram illustrating examples of determinations made in step S120, step S130, and step S140 in FIG. 6.

DESCRIPTION OF EXEMPLARY EMBODIMENTS

Preferred embodiments of the present disclosure will be described hereinafter with reference to the accompanying drawings. The drawings are used for explanatory convenience. Note that the embodiments described below do not unduly limit the present disclosure described in claims. Furthermore, it is not necessarily the case that all components described below are requirements of the present disclosure.

1. First Embodiment

Description will be made taking a mobile ink jet printer serving as a liquid ejecting apparatus which forms an image on a medium by ejecting ink as liquid and which may be driven based on electric power supplied from a battery as an example of a mobile device according to a first embodiment. Note that the mobile ink jet printer is simply referred to as a mobile printer in the description below. Furthermore, examples of the medium on which an image is formed by the mobile printer include various recording sheets including plain paper to be used for printing of images and the like, glossy paper to be used for printing of photographs and the like, and postcards.

1.1 Appearance of Mobile Printer

First, an appearance configuration of a mobile device M will be described with reference to FIGS. 1 to 3. Note that X, Y, and Z axes are orthogonally intersect with one another in the description below. A starting point side in the X axis is referred to as a "−X direction" and an opposite side of the starting point side is referred to as a "+X direction" where appropriate, and furthermore, the "−X direction" and the "+X direction" are collectively referred to as an "X direction" where appropriate. Similarly, a starting point side in the Y axis is referred to as a "−Y direction" and an opposite side of the starting point side is referred to as a "+Y direction" where appropriate, and furthermore, the "−Y direction" and the "+Y direction" are collectively referred to as a "Y direction" where appropriate. Similarly, a starting point side in the Z axis is referred to as a "−Z direction" and an opposite side of the starting point side is referred to as a "+Z direction" where appropriate, and furthermore, the "−Z direction" and the "+Z direction" are collectively referred to as a "Z direction" where appropriate. Furthermore, although it is assumed that the X, Y, and Z axes orthogonally intersect with one another in the description below, it is not necessarily the case that units included in a mobile printer 1 serving as the mobile device M orthogonally intersect with one another.

Figure 1:
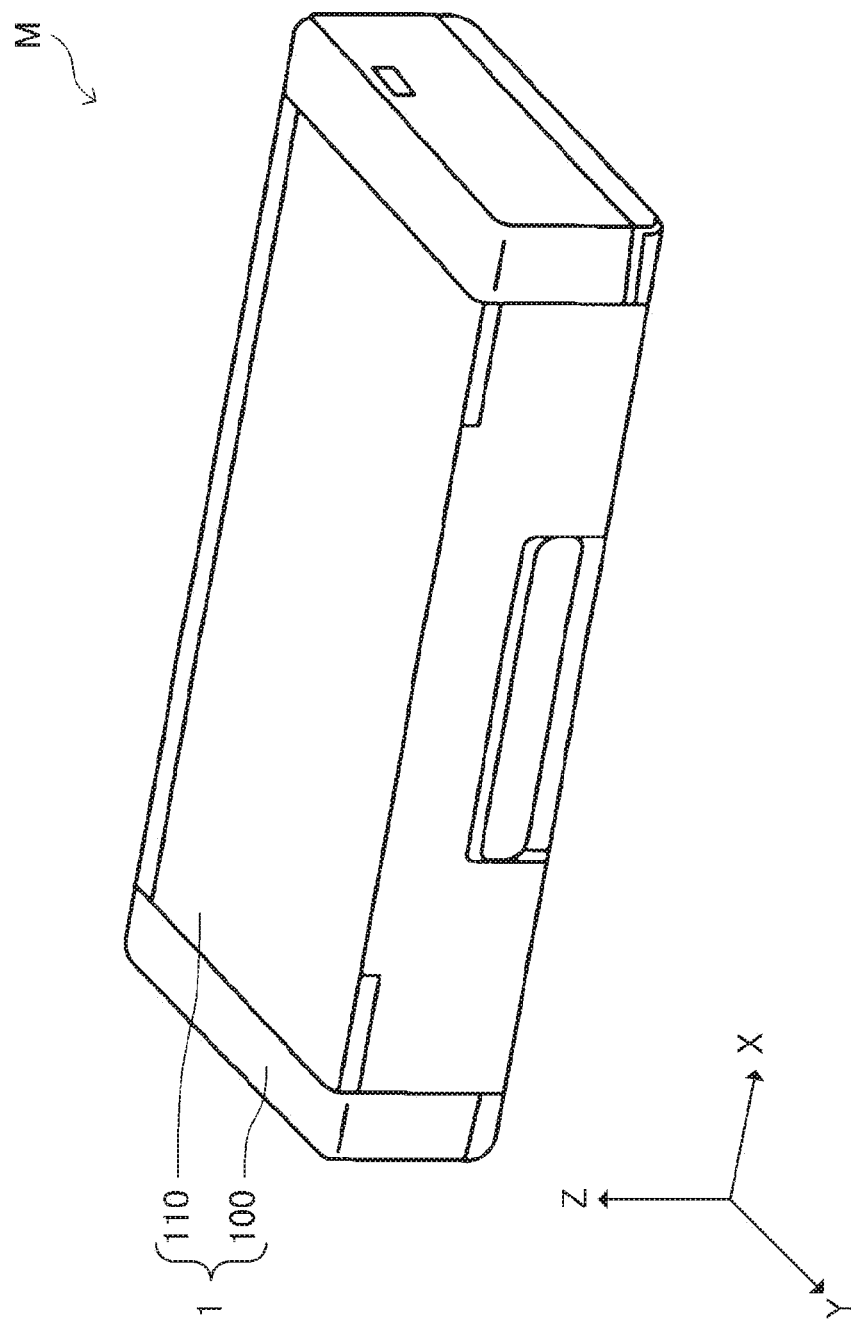
FIG. 1 is a diagram illustrating a mobile device viewed from a +Y direction.

FIG. 1 is a diagram illustrating the mobile device M viewed from the +Y direction. FIG. 2 is a diagram illustrating the mobile device M viewed from the +Y direction when a cover 110 of the mobile printer 1 as the mobile device M is opened. FIG. 3 is a diagram illustrating the mobile device M viewed from the −Y direction.

As illustrated in FIG. 1, the mobile printer 1 serving as the mobile device M includes a case 100 and the opening/closing cover 110 on an upper portion of the case 100.

Figure 2:
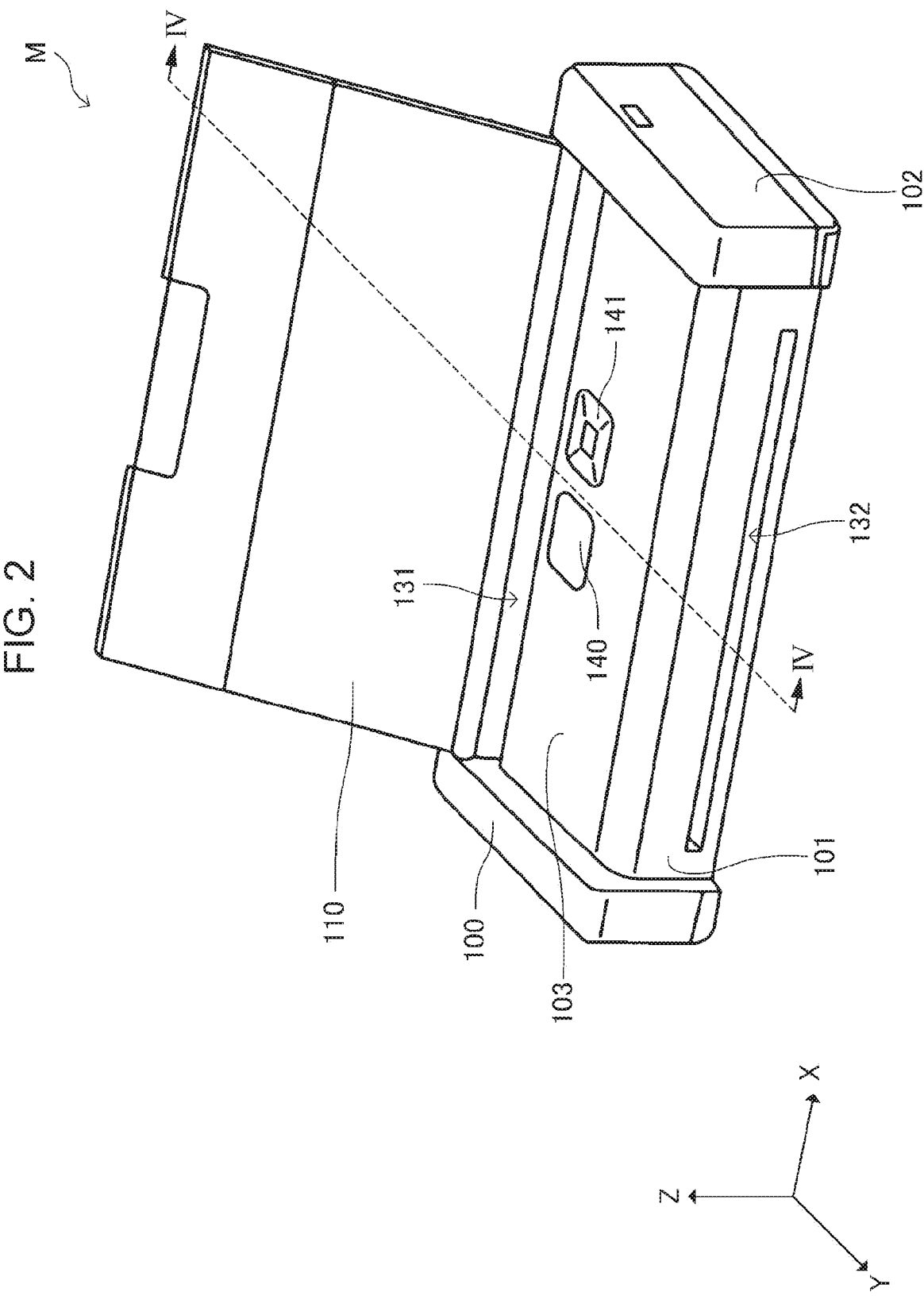
FIG. 2 is a diagram illustrating the mobile device viewed from the +Y direction when a cover of a mobile printer serving as the mobile device is opened.
Figure 3:
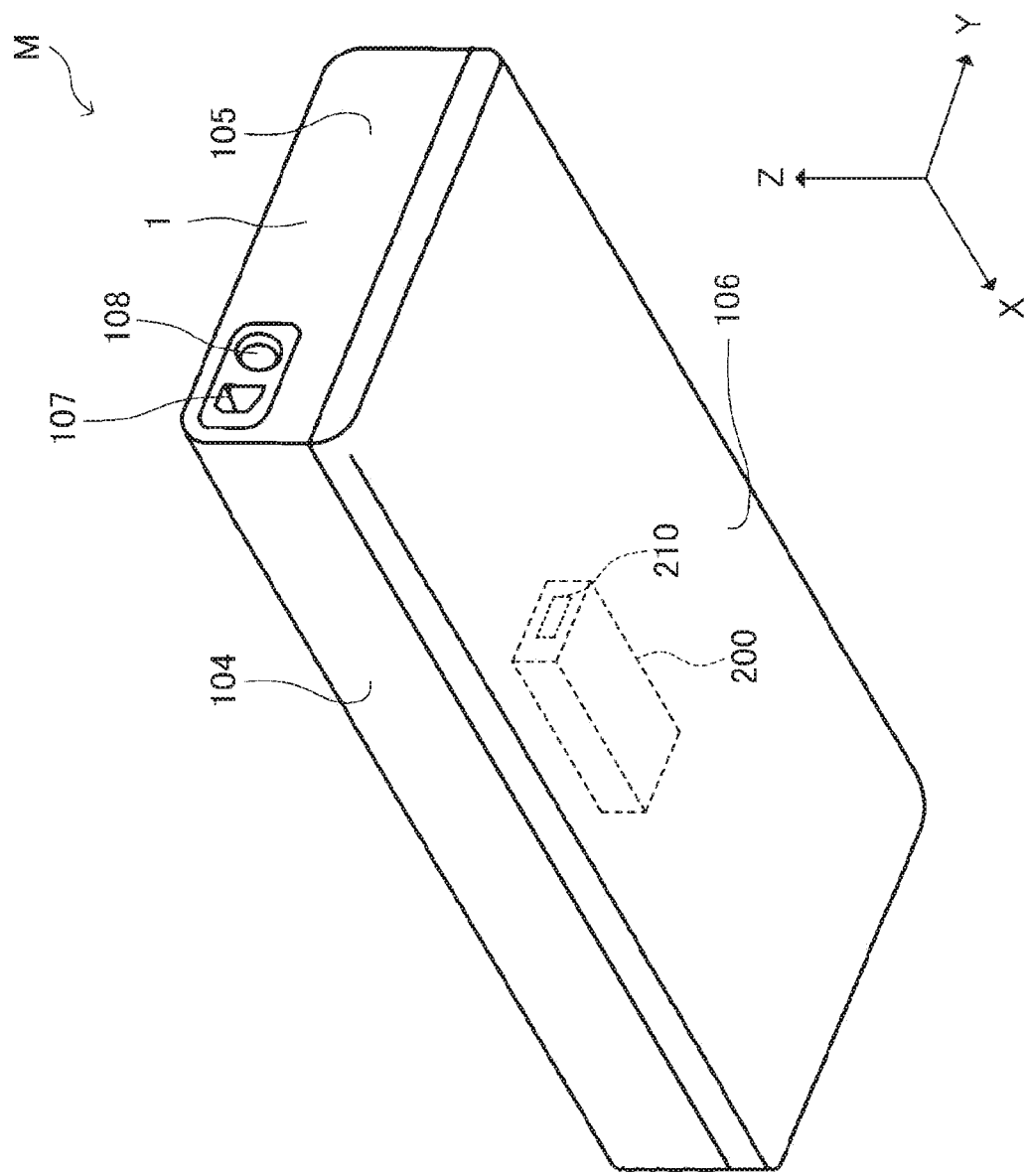
FIG. 3 is a diagram illustrating the mobile device viewed from a −Y direction.

As illustrated in FIGS. 2 and 3, the case 100 includes wall sections 101 to 106. The wall section 101 is positioned on the case 100 in the +Y direction. The wall section 102 is positioned on the case 100 in the +X direction. The wall section 103 is positioned on the case 100 in the +Z direction. The wall section 104 is positioned on the case 100 in the −Y direction. The wall section 105 is positioned on the case 100 in the −X direction. The wall section 106 is positioned on the case 100 in the −Z direction. Specifically, the wall section 101 and the wall section 104 face each other in the Y direction, the wall section 102 and the wall section 105 face each other in the X direction, and the wall section 103 and the wall section 106 face each other in the Z direction. In other words, the case 100 of the mobile printer 1 is surrounded by the wall sections 101 to 106 and has a substantially rectangular parallelepiped shape having an internal space.

Furthermore, a display panel 140 and an operation switch 141 are disposed on the wall section 103 of the case 100. The display panel 140 displays information based on operations and states of the mobile printer 1. The display panel 140 may be a liquid crystal panel, an electronic paper panel, or an organic electroluminescence panel. The operation switch 141 receives operations performed by a user. Note that the display panel 140 and the operation switch 141 disposed on the wall section 103 may be a touch panel formed by integrally laminating the display panel 140 and the operation switch 141.

A supply port 131 used to supply media to an inside of the case 100 is disposed on the wall section 103 in the −Y direction. Furthermore, a discharge port 132 used to discharge the media supplied to the inside of the case 100 is disposed on the wall section 101. A medium supplied to the inside of the case 100 from the supply port 131 is transported in the case 100 and discharged from the discharge port 132. Furthermore, liquid is ejected to the medium while the medium is transported in the case 100. Then the ejected liquid is attached to the medium to be discharged from the discharge port 132 so that an image based on the attached liquid is formed on the medium.

Furthermore, as illustrated in FIG. 3, the case 100 includes an accommodation section 200 accommodating a battery 20 described below and a connection section 210 electrically coupled to the battery 20 accommodated in the accommodation section 200. When the battery 20 is accommodated in the accommodation section 200, the battery 20 and the connection section 210 are electrically coupled to each other. By this, electric power corresponding to a voltage output from the battery 20 is supplied to the mobile printer 1. Specifically, the mobile printer 1 is driven based on the electric power corresponding to the voltage supplied from the battery 20.

As illustrated in FIG. 3, a direct current (DC) jack 108 to which a DC plug of an alternating current (AC) adapter, not illustrated, may be inserted and a universal serial bus (USB) port 107 to which a USB cable may be attached are disposed on the wall section 105. The mobile printer 1 is coupled to an external apparatus, such as a personal computer or a digital still camera, in a communication available manner through a USB cable coupled to the USB port 107. By this, image information Img corresponding to an image to be formed on the medium is supplied from the external apparatus to the mobile printer 1. Furthermore, a voltage is supplied from an external power source, such as an AC adapter, to the mobile printer 1 through the DC jack 108. Specifically, the mobile printer 1 may be driven based on electric power corresponding to the voltage which is supplied from the DC jack 108 and which serves as a power source voltage.

1.2 Internal Configuration of Case of Mobile Printer

Figure 4:
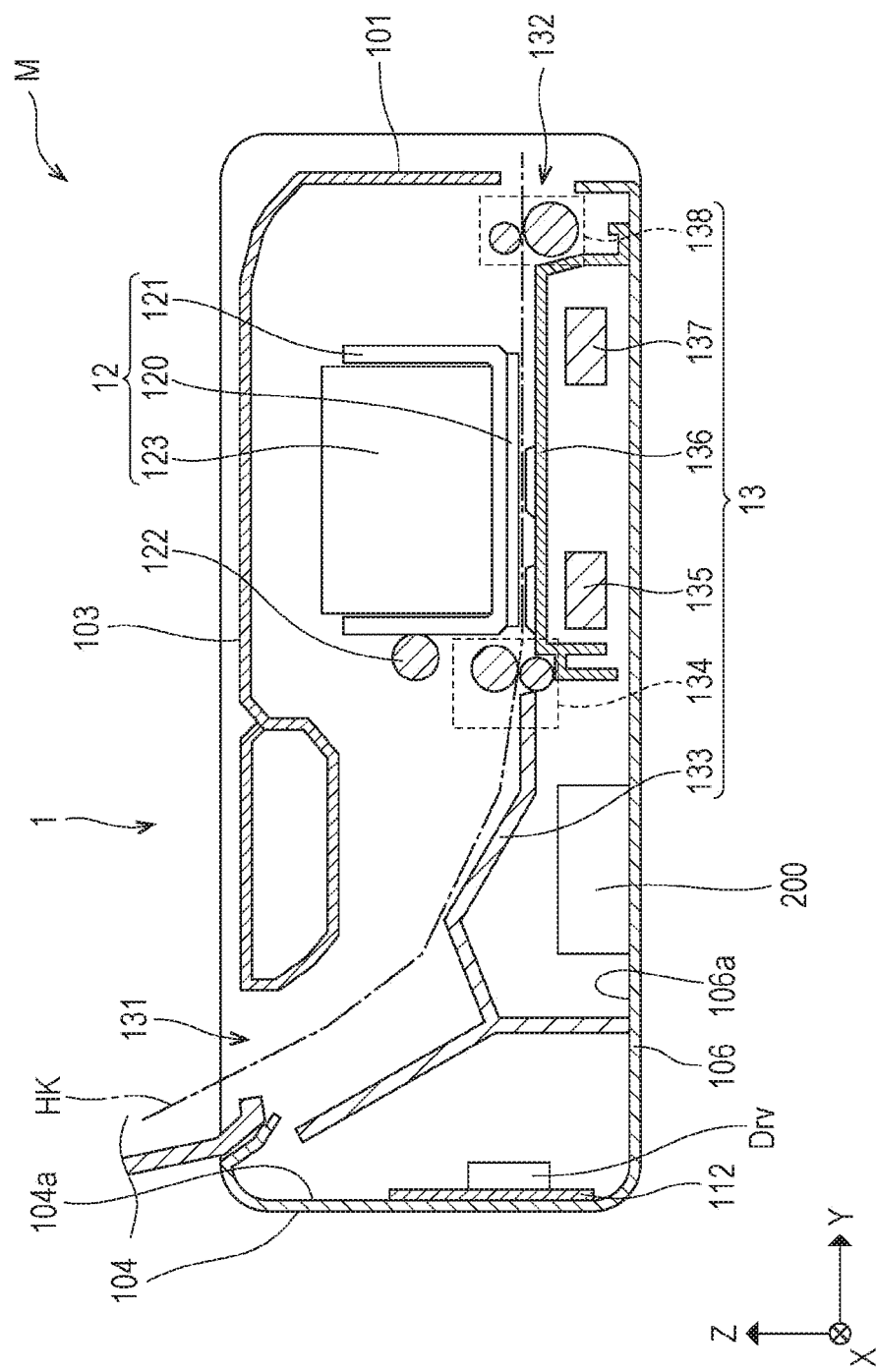
FIG. 4 is a cross-sectional view of the mobile device taken along a line IV to IV of FIG. 2.

Next, an internal configuration of the case 100 of the mobile printer 1 will be described. FIG. 4 is a cross-sectional view of the mobile device M taken along a line IV to IV in FIG. 2.

As illustrated in FIG. 4, the case 100 of the mobile printer 1 includes a head unit 12 and a transport unit 13.

The head unit 12 includes an ejection head 120, a carriage 121, and a liquid storage section 123. The carriage 121 is supported by a carriage guide shaft 122 extending in the X direction in a portion in the −Y direction in a reciprocation available manner. The carriage 121 reciprocates in the X direction while being supported by the carriage guide shaft 122. The ejection head 120 is disposed in a portion in the −Z direction of the carriage 121. Furthermore, the liquid storage section 123 which stores liquid to be ejected from the ejection head 120 is disposed on a portion in the +Z direction of the carriage 121. The liquid storage section 123 and the ejection head 120 are coupled to each other through a liquid flow path not illustrated. Specifically, the liquid stored in the liquid storage section 123 is supplied to the ejection head 120 through the liquid flow path not illustrated. Thereafter, the ejection head 120 ejects the supplied liquid.

The transport unit 13 includes a medium support section 133, a transport roller pair 134, a driving motor 135, a platen 136, a driving motor 137, and a transport roller pair 138. The medium support section 133 and the platen 136 form a transport path HK which transports a medium supplied from the supply port 131 to the discharge port 132. The medium supplied to the supply port 131 is transported from the medium support section 133 to the platen 136 when the transport roller pair 134 is driven. The platen 136 faces the ejection head 120 attached to the carriage 121 in the Z direction. While the medium is supported by the platen 136, liquid is ejected from the ejection head 120 and the liquid is landed on the medium so that an image is formed. Thereafter, the medium is transported to the discharge port 132 when the transport roller pair 138 is driven.

The transport roller pair 134 and the transport roller pair 138 used to transport the medium are controlled by driving of the driving motor 137. Furthermore, reciprocation of the carriage 121 is controlled by driving of the driving motor 135. Specifically, when the driving motor 135 and the driving motor 137 are controlled, the transport of the medium and a movement of the carriage 121 to which the ejection head 120 is attached are controlled. By this, a predetermined amount of liquid may be ejected to a desired portion on the medium, and accordingly, a desired image is formed on the medium.

A circuit substrate 112 including a plurality of circuits implemented thereon including a driving unit Drv outputting a control signal for operating the head unit 12 and the transport unit 13 is disposed in a portion in the −Y direction of the transport path HK. The circuit substrate 112 is attached to an inner surface 104a of the wall section 104 of the case 100. In other words, at least a portion of the driving unit Drv is in contact with the case 100. Since the driving unit Drv outputs a control signal to operate the head unit 12 and the transport unit 13, it is likely that the driving unit Drv consumes a larger amount of electric power when compared with the head unit 12 and the transport unit 13, and consequently, heat generated by the driving unit Drv may be higher than heat generated by the head unit 12 and heat generated by the transport unit 13. As illustrated in FIG. 4, since at least a portion of the driving unit Drv is in contact with the case 100, heat generated by the driving unit Drv is released through the case 100. Consequently, rise in temperature of the driving unit Drv may be reduced.

The accommodation section 200 is disposed in a portion on an inner surface 106a of the wall section 106 of the case 100 which is in the −Z direction of the transport path HK. An opening/closing cover portion, not illustrated, for accommodating the battery 20 in the accommodation section 200 may be disposed in a contact section in which the accommodation section 200 and the wall section 106 are in contact with each other.

1.3 Functional Configuration of Mobile Printer

Figure 5:
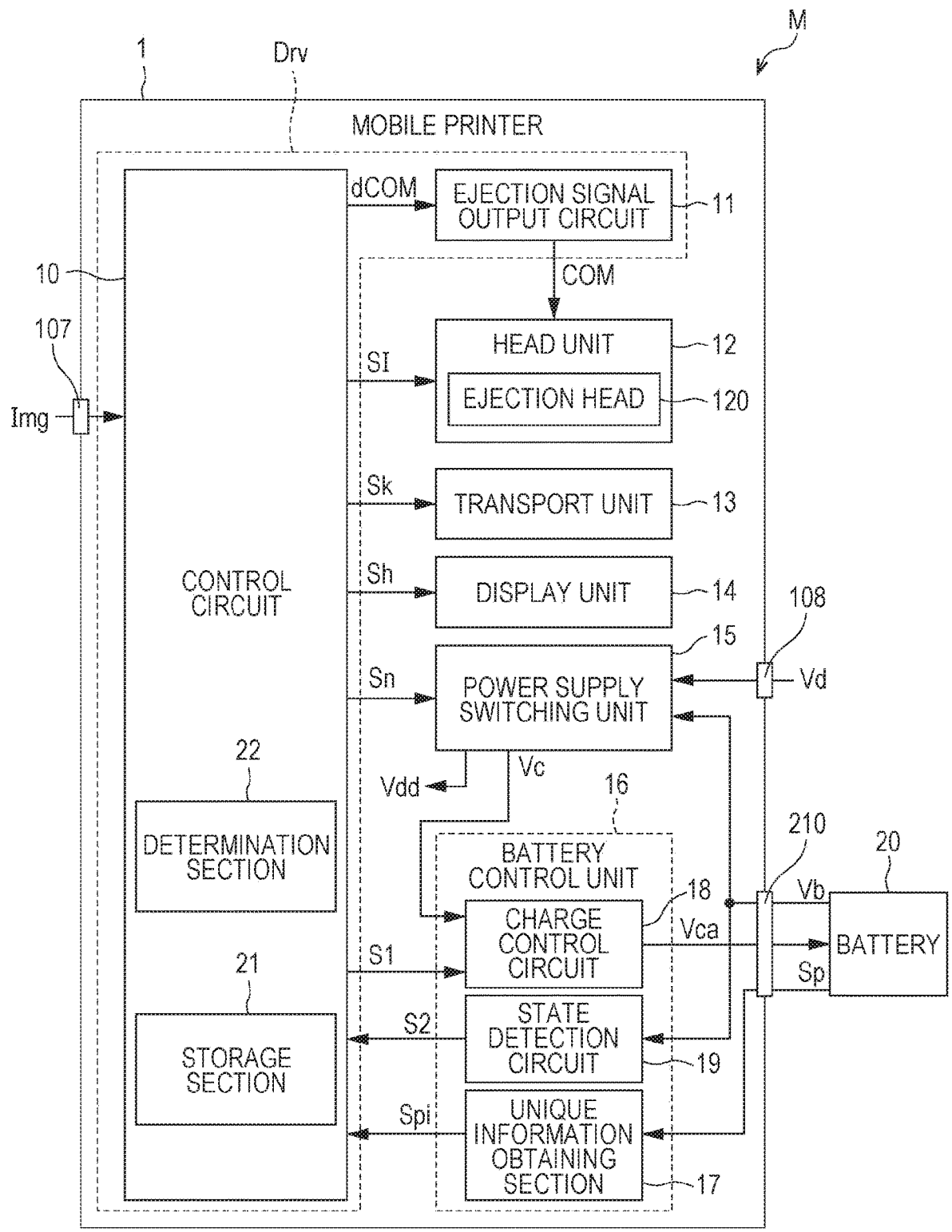
FIG. 5 is a diagram illustrating a functional configuration of the mobile device.

Here, a functional configuration of the mobile printer 1 will be described with reference to FIG. 5. FIG. 5 is a diagram illustrating a functional configuration of the mobile device M.

The mobile printer 1 includes at least one control circuit 10, an ejection signal output circuit 11, the head unit 12, the transport unit 13, a display unit 14, a power supply switching unit 15, and a battery control unit 16.

The control circuit 10 generates and outputs various control signals based on image information Img externally input through the USB port 107 so as to control operation of the mobile printer 1. The control circuit 10 includes a central processing unit (CPU), for example. Note that the control circuit 10 may include at least one of a digital signal processor (DSP), an application specific integrated circuit (ASIC), a programmable logic device (PLD), and a field programmable gate array (FPGA) instead of the CPU or in addition to the CPU.

The control circuit 10 generates a digital waveform prescribing signal dCOM for prescribing a waveform of an ejection signal COM to be output from the ejection signal output circuit 11 and outputs the waveform prescribing signal dCOM to the ejection signal output circuit 11. After converting the digital waveform prescribing signal dCOM into an analog signal, the ejection signal output circuit 11 performs class-D amplification on the converted analog signal to generate the ejection signal COM. Specifically, the digital waveform prescribing signal dCOM prescribes a waveform of the ejection signal COM, and the ejection signal output circuit 11 generates the ejection signal COM having a predetermined voltage value by performing the D-class amplification on the waveform prescribed by the waveform prescribing signal dCOM, and outputs the generated ejection signal COM to the head unit 12. Note that the waveform prescribing signal dCOM at least prescribes the waveform of the ejection signal COM and may be an analog signal. Furthermore, the ejection signal output circuit 11 at least amplifies the waveform prescribed by the waveform prescribing signal dCOM so as to obtain a predetermined voltage value and may include a class-A amplification circuit, a class-B amplification circuit, and a class-AB amplification circuit.

The control circuit 10 generates an ejection control signal SI for controlling ejection of liquid from a liquid ejection section not illustrated included in the ejection head 120 of the head unit 12 and outputs the generated ejection control signal SI to the head unit 12. The liquid ejection section included in the ejection head 120 includes a nozzle and a driving element to be used to eject liquid from the nozzle. The driving element is driven when the ejection signal COM is supplied. Thereafter, an amount of liquid corresponding to the driving of the driving element is ejected from the nozzle. Furthermore, the ejection head 120 controls supply of the ejection signal COM to the driving element based on the input ejection control signal SI. In this way, a predetermined amount of liquid is ejected from the nozzle included in the liquid ejection section of the ejection head 120 at a predetermined timing. Here, examples of the driving element included in the head unit 12 include a piezoelectric element displaced based on the ejection signal COM and a heat element which heats based on the ejection signal COM. Specifically, the head unit 12 is an example of a mechanical force generation section which operates or displaces an object and an example of a temperature changing section which changes a temperature.

Furthermore, the control circuit 10 generates a transport control signal Sk to be output to the transport unit 13 so as to control the transport unit 13. The transport unit 13 transports a medium in a predetermined transport direction. A desired amount of liquid is ejected to a desired position of the medium when a timing when the transport unit 13 transports the medium based on the transport control signal Sk and a timing when the ejection head 120 ejects liquid based on the ejection control signal SI are synchronized with each other. In this way, a desired image is formed on the medium. Here, the transport unit 13 is an example of the mechanical force generation section which operates the medium and the carriage 121 in a predetermined direction.

Furthermore, the control circuit 10 generates a display control signal Sh controlling display of various information in the display unit 14 and outputs the display control signal Sh in the display unit 14. The display unit 14 displays the various information including operation information and state information of the mobile device M in accordance with the display control signal Sh. By this, the information including operation and states of the mobile device M is reported to the user. The display unit 14 includes the display panel 140, the operation switch 141, a touch panel formed by integrating the display panel 140 and the operation switch 141, and the like as described above. Furthermore, the display unit 14 may notify the user of various information by means of light using a light emitting element or the like or sound such as voice. Here, the display unit 14 which notifies the user of various information by means of sound or light depending on information to be displayed in the display panel 140 is an example of a sound generation section generating sound or a light generation section generating light.

Furthermore, the control circuit 10 generates a power source selection signal Sn to control selection of a supply source of a power source voltage to be supplied to drive the mobile printer 1 and outputs the generated power source selection signal Sn to the power supply switching unit 15.

Specifically, a voltage Vb supplied from the battery 20 through the connection section 210 and a voltage Vd supplied from the AC adapter disposed outside the mobile device M through the DC jack 108 are input to the power supply switching unit 15. The power supply switching unit 15 selects one of the voltages Vb and Vd based on the power source selection signal Sn and supplies the selected one of the voltages Vb and Vd to the sections included in the mobile printer 1 as a voltage Vdd serving as a power source voltage of the mobile printer 1.

Here, the voltage Vdd output from the power supply switching unit 15 is supplied to the various sections of the mobile printer 1 including the head unit 12, the transport unit 13, and the display unit 14. In other words, the head unit 12, the transport unit 13, and the display unit 14 are driven by electric power based on the voltage Vb supplied from the battery 20 or the voltage Vd supplied from the AC adapter through the DC jack 108. Specifically, the head unit 12, the transport unit 13, and the display unit 14 are examples of a driving circuit. Furthermore, the battery 20 is an all-solid-state battery having a solid electrolyte in this embodiment. That is, the mobile printer 1 serving as the mobile device M is driven based on electric power supplied from the battery 20 which is the all-solid-state battery. Note that, although the battery 20 is disposed outside the mobile printer 1 in FIG. 5, the battery 20 is disposed in the accommodation section 200 incorporated in the mobile printer 1 in a detachable manner in practice.

Furthermore, the power supply switching unit 15 generates and outputs a voltage Vc having a constant current value or a constant voltage value to charge the battery 20 based on the voltage Vd.

Furthermore, the control circuit generates a control signal S1 to control the battery control unit 16 and outputs the generated control signal S1 to the battery control unit 16. Furthermore, a state signal S2 and a unique information signal Spi are supplied to the control circuit 10 from the battery control unit 16.

The battery control unit 16 includes a charge control circuit 18 controlling charge of the battery 20, a state detection circuit 19 which detects a state of the battery 20 and which generates and outputs the state signal S2 indicating a result the detection, and a unique information obtaining section 17 obtaining unique information of the battery 20.

The state detection circuit 19 detects a voltage value of the voltage Vb supplied from the battery 20, for example, as a state of the battery 20. By this, the state detection circuit 19 detects the battery 20 coupled to the connection section 210. Then, the state detection circuit 19 generates the state signal S2 indicating the state of the battery 20 in accordance with a result of the detection and outputs the state information S2 to the control circuit 10.

The control circuit 10 generates the power source selection signal Sn based on the supplied state signal S2 and outputs the generated power source selection signal Sn to the power supply switching unit 15. In this way, the power supply switching unit 15 may select the voltage Vb supplied from the battery 20. Since the power supply switching unit 15 selects the voltage Vb based on the power source selection signal Sn and outputs the voltage Vdd, the mobile printer 1 is driven by electric power based on the voltage Vb supplied from the battery 20.

Furthermore, the state detection circuit 19 detects a voltage value of the voltage Vb supplied from the battery 20 and a temperature of the battery 20, for example, as a state of the battery 20, generates a state signal S2 indicating the state of the battery 20 in accordance with a result of the detection, and outputs the state signal S2 to the control circuit 10. The control circuit 10 determines whether the battery 20 is to be charged with reference to the detected voltage value of the voltage Vb and the detected temperature of the battery 20, generates a control signal S1 in accordance with a result of the determination, and outputs the control signal S1 to the charge control circuit 18. Thereafter, the charge control circuit 18 determines whether the voltage Vc supplied from the power supply switching unit 15 is to be output as a voltage Vca to be used to charge the battery 20 based on the control signal S1.

The unique information obtaining section 17 reads and obtains unique information Sp stored in the battery 20. The unique information Sp stored in the battery 20 includes manufacturing information including a name of a manufacturer of the battery 20, a location of manufacture, and a manufacturing date, characteristic information including a nominal voltage and rating capacity, and charge/discharge characteristic information including a charge method, a charge voltage, and a discharge voltage. Such unique information is stored in a microchip or the like mounted on the battery 20, for example. The unique information obtaining section 17 generates a unique information signal Spi based on the obtained unique information Sp and outputs the generated unique information signal Spi to the control circuit 10. When the control circuit 10 examines the unique information signal Spi output from the unique information obtaining section 17 so as to determine whether the battery 20 accommodated in the accommodation section 200 is to be suitably used in the mobile printer 1. The unique information obtaining section 17 is an example of an obtaining section.

Specifically, the control circuit 10 includes a storage section 21 and a determination section 22. The storage section 21 stores information corresponding to a plurality of types of battery as unique information data Dpi. The determination section 22 compares the unique information signal Spi input from the unique information obtaining section 17 with the unique information data Dpi stored in the storage section 21 and determines whether the battery 20 accommodated in the accommodation section 200 is available for the mobile printer 1 serving as the mobile device M in accordance with a result of the comparison. Thereafter, the control circuit 10 controls driving of the sections included in the mobile printer 1 based on a result of the determination made by the determination section 22.

Figure 6:
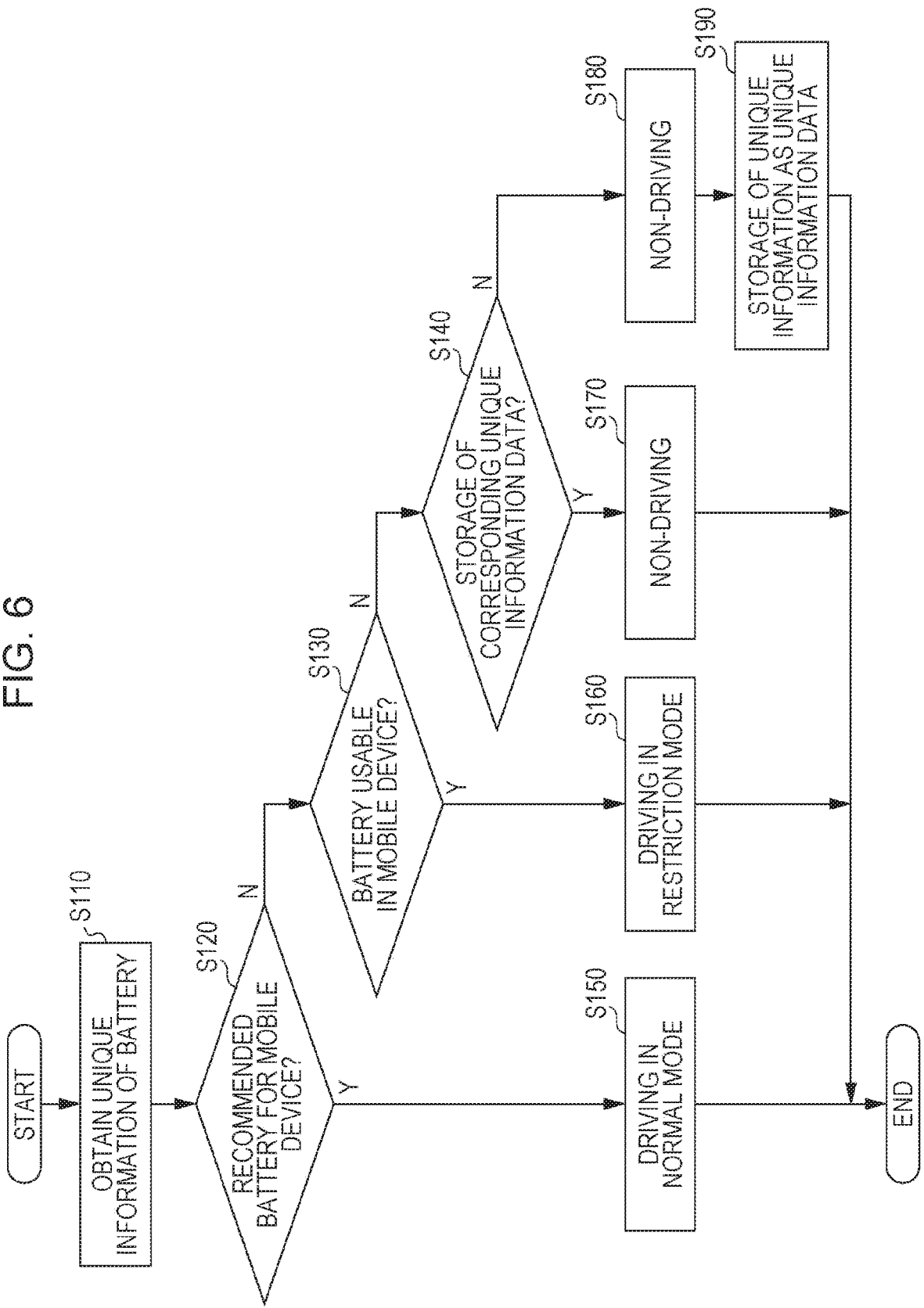
FIG. 6 is a diagram illustrating a method for controlling driving of the mobile printer.

A result of the determination made by the determination section 22 and a method for controlling driving of the mobile printer 1 performed by the control circuit 10 in accordance with the result of the determination will be described with reference to FIG. 6. FIG. 6 is a diagram illustrating a method for controlling driving of the mobile printer in accordance with a result of comparison between the unique information signal Spi and the unique information data Dpi performed by the determination section 22 which is employed in the control circuit 10.

First, when the battery 20 is accommodated in the accommodation section 200, the unique information obtaining section 17 obtains the unique information Sp stored in the battery 20 (S110). Subsequently, the unique information obtaining section 17 outputs the obtained unique information Sp to the control circuit 10 as the unique information signal Spi.

The control circuit 10 compares the unique information Sp of the battery 20 included in the unique information signal Spi with the unique information data Dpi stored in the storage section 21. Specifically, the determination section 22 determines whether the battery 20 accommodated in the accommodation section 200 is recommended for use in the mobile device M (S120). Note that, when various information including the manufacturing information, the characteristic information, and the charge/discharge characteristic information included in the unique information Sp is stored in the storage section 21 as the unique information data Dpi, the unique information Sp matches a product specification of the mobile printer 1, and performance of the mobile printer 1 using a battery corresponding to the unique information Sp is sufficiently evaluated, the battery is recommended for use in the mobile device M. In other words, such a battery is reliably used in the mobile printer 1.

Furthermore, when the determination section 22 determines that the battery 20 accommodated in the accommodation section 200 is recommended for use in the mobile device M (Y in S120), the control circuit 10 drives the sections included in the mobile printer 1 in the normal mode (S150). In the normal mode, the mobile printer 1 is not particularly restricted in the driving for executing a print process of forming an image on a medium and the like.

When the determination section 22 determines that the battery 20 accommodated in the accommodation section 200 is not a battery recommended for use in the mobile device M (N in S120), the determination section 22 determines whether the battery 20 accommodated in the accommodation section 200 is usable in the mobile device M (S130). When the various information including the manufacturing information, the characteristic information, and the charge/discharge characteristic information included in the unique information Sp is stored in the storage section 21 as the unique information data Dpi and the unique information Sp matches the product specification of the mobile printer 1, but the performance of the mobile printer using the battery corresponding to the unique information Sp is not sufficiently evaluated, the battery is usable in the mobile device M. In other words, the battery is usable in the mobile printer 1 but reliability of the battery is not sufficient, and therefore, performance for the mobile printer is low. Examples of the performance include a discharge rate, a charge rate, capacity, a voltage, and a battery life.

When the determination section 22 determines that the battery 20 accommodated in the accommodation section 200 is usable in the mobile device M (Y in S130), the control circuit 10 drives the sections included in the mobile printer 1 in a restriction mode (S160). In the restriction mode, the mobile printer 1 partially restricts a print speed, a transport speed of the medium, display luminance and display content of the display unit 14, and the like in driving for executing a print process of forming an image on the medium and the like, so that power consumption of the mobile printer 1 is reduced. By this, a load applied to the battery 20 accommodated in the accommodation section 200 of the mobile printer 1 may be reduced, and even when a battery which is not determined to have sufficient reliability is attached, probability of occurrence of malfunction of the mobile printer 1 serving as the mobile device M may be reduced.

When determining that the battery 20 accommodated in the accommodation section 200 is not usable in the mobile device M (N in S130), the determination section 22 determines whether the unique information data Dpi corresponding to the unique information Sp of the battery 20 accommodated in the accommodation section 200 is stored in the storage section 21 (S140). When the unique information data Dpi corresponding to the unique information Sp of the battery 20 accommodated in the accommodation section 200 is stored in the storage section 21 (Y in S140), the control circuit 10 does not drive the sections included in the mobile printer 1 (S170). In other words, the control circuit 10 stops driving of the sections of the mobile printer 1. Therefore, an image, for example, is not formed on a medium. In this case, when the driving is stopped, information indicating that the battery 20 accommodated in the accommodation section 200 is unusable in the mobile printer 1 and a reason thereof may be reported to the user.

When the unique information data Dpi corresponding to the unique information Sp of the battery 20 accommodated in the accommodation section 200 is not stored in the storage section 21 (N in S140), the control circuit 10 does not drive the sections included in the mobile printer 1 (S180). In other words, the control circuit 10 stops driving of the sections included in the mobile printer 1. In this case, when the driving is stopped, information indicating that the battery 20 accommodated in the accommodation section 200 is unusable in the mobile printer 1 and a reason thereof may be reported to the user. Furthermore, the control circuit 10 stores the unique information Sp in the storage section 21 as the unique information data Dpi (S190). When the mobile printer 1 is coupled to an external server through the Internet later, the external server obtains the unique information Sp stored in the storage section 21 so that a battery highly demanded by the user may be recognized although the battery is unavailable for the mobile printer at this time point.

As described above, in the mobile printer 1 according to this embodiment, when the unique information Sp obtained by the unique information obtaining section 17 indicates the battery 20 recommended for use in the mobile device M, the control circuit 10 performs control such that the sections included in the mobile printer 1 enter the normal mode. On the other hand, when the unique information Sp obtained by the unique information obtaining section 17 indicates the battery 20 usable in the mobile printer, the control circuit 10 performs control such that the sections included in the mobile printer 1 enter the restriction mode. Furthermore, when the unique information Sp obtained by the unique information obtaining section 17 does not indicate the battery 20 recommended for use in the mobile device M or the battery 20 usable in the mobile device M, the control circuit 10 stops the driving of the sections included in the mobile printer 1.

The battery 20 recommended for use in the mobile device M is an example of a first battery, and the unique information Sp indicating the battery 20 recommended for use in the mobile device M is an example of first unique information. Furthermore, the battery 20 usable in the mobile device M is an example of a second battery, and the unique information Sp indicating the battery 20 usable in the mobile device M is an example of second unique information. Furthermore, the normal mode is an example of a first driving state, and the restriction mode is an example of a second driving state.

FIG. 11 is a diagram illustrating examples of the determinations made in step S120, step S130, and step S140 in FIG. 6. In the example of FIG. 11, the storage section 21 stores names of manufacturers and manufacturing years of batteries as the unique information data Dpi, and stores results of a determination as to whether the batteries are recommended for use, usable, or unusable in the mobile device M which are associated with combinations between the names of manufacturers and the manufacturing years.

When the unique information Sp indicates α company as a manufacturer, for example, it is determined that use of the mobile device M is recommended irrespective of a manufacturing year. Furthermore, when the unique information Sp indicates β company as a manufacturer, for example, it is determined that use of batteries corresponding to manufacturing years of 2031 or later indicated by the unique information Sp in the mobile device M is recommended whereas it is determined that batteries corresponding to manufacturing years of 2030 or earlier indicated by the unique information Sp are usable in the mobile device M. This determination is made when only the batteries manufactured by β company in 2031 or later have sufficient reliability, for example.

Furthermore, when the unique information Sp indicates γ company as a manufacturer, it is determined that batteries manufactured by γ company are usable in the mobile device M irrespective of a manufacturing year. This determination is made in a situation in which although performance of the battery manufactured by γ company is lower than the battery manufactured by α company, a significant problem does not arise when driving is performed in the restriction mode.

Furthermore, when the unique information Sp indicates δ company as a manufacturer, for example, it is determined that batteries corresponding to manufacturing years of 2031 or later indicated by the unique information Sp are usable in the mobile device M whereas it is determined that batteries corresponding to manufacturing years of 2030 or earlier indicated by the unique information Sp are unusable in the mobile device M. This determination is made when a significant problem arises in the mobile device M even in driving in the restriction mode when the battery manufactured by δ company in 2030 or earlier is used.

Note that, as described above, when the unique information signal Spi corresponding to the unique information data Dpi not illustrated in FIG. 11 is supplied, a negative determination is made in step S120, step S130, and step S140, and therefore, the sections included in the mobile device M are not driven. This operation is performed when the unique information Sp indicates ε company as a manufacturer, for example.

1.4 Operation Effects

The mobile printer 1 serving as the mobile device M according to the first embodiment described above is driven based on electric power supplied from the battery 20 which is the all-solid-state battery having a solid electrolyte. The unique information obtaining section 17 included in the mobile printer 1 obtains the unique information Sp stored in the battery 20 electrically coupled to the mobile printer 1 through the connection section 210. Specifically, the mobile printer 1 may obtain product information, characteristic information, charge/discharge characteristic information, and the like of the battery 20 coupled through the connection section 210. By this, a determination as to whether the characteristics of the battery 20 coupled to the mobile printer 1 are suitable for the mobile printer 1 may be made, and consequently, probability of malfunction of the mobile device M caused when different batteries 20 having different characteristics are employed in the mobile printer 1 as the mobile device M may be reduced.

1.5 Modification

In the mobile device M described above, the unique information data Dpi stored in the storage section 21 may be stored on the network, for example, or content stored in the storage section 21 may be appropriately updated through a network line. By this, the determination as to whether the battery 20 electrically coupled to the mobile printer 1 through the connection section 210 is suitable for the mobile printer 1 may be made based on latest unique information. Accordingly, probability of malfunction of the mobile device M caused when different batteries 20 having different characteristics are employed in the mobile printer 1 as the mobile device M may be further reduced.

2. Second Embodiment

As a mobile device according to a second embodiment, a smartphone which is a display device displaying various information on a display panel and which may be operated by a battery will be described as an example. Note that, in the description of the mobile device according to the second embodiment, the same components are denoted by the same reference numerals and detailed descriptions thereof are omitted or simplified.

Figure 7:
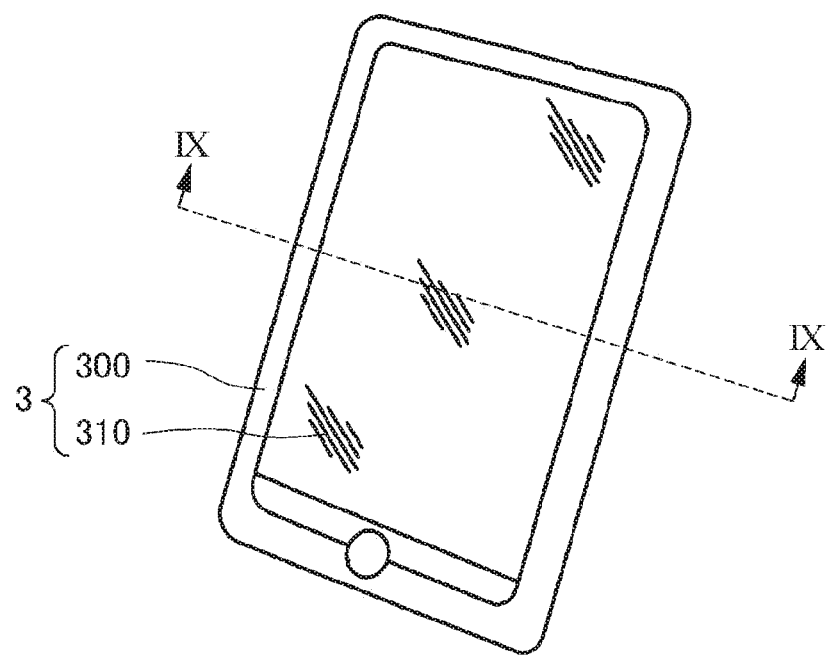
FIG. 7 is a front view of a mobile device according to a second embodiment.
Figure 8:
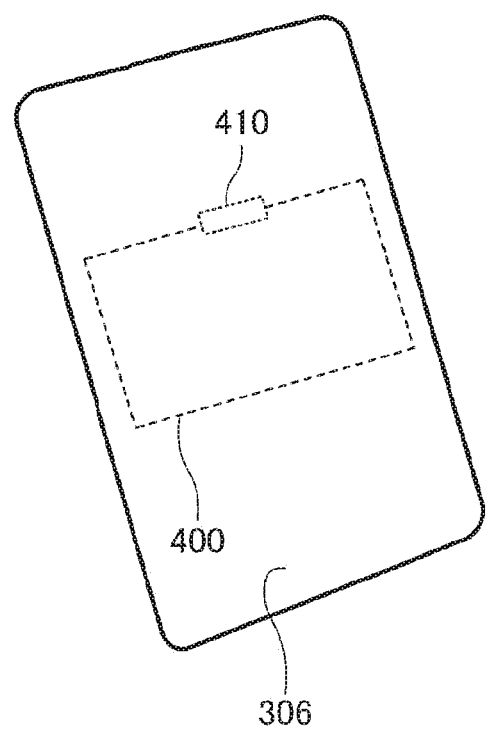
FIG. 8 is a back view of the mobile device according to the second embodiment.
Figure 9:
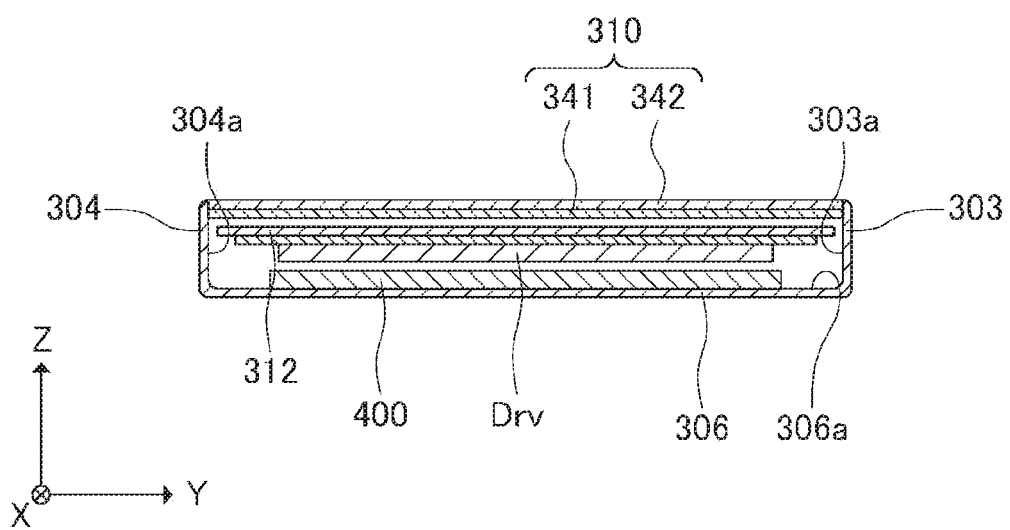
FIG. 9 is a cross-sectional view of the mobile device taken along a line XV to XV of FIG. 7 according to the second embodiment.

FIGS. 7 to 9 are diagrams illustrating a configuration of a smartphone 3 serving as a mobile device M. Note that X, Y, and Z axes are orthogonally intersect with one another in the description below. A starting point side in the X axis is referred to as a "−X direction" and an opposite side of the starting point side is referred to as a "+X direction" where appropriate, and furthermore, the "−X direction" and the "+X direction" are collectively referred to as an "X direction" where appropriate. Similarly, a starting point side in the Y axis is referred to as a "−Y direction" and an opposite side of the starting point side is referred to as a "+Y direction" where appropriate, and furthermore, the "−Y direction" and the "+Y direction" are collectively referred to as a "Y direction" where appropriate. Similarly, a starting point side in the Z axis is referred to as a "−Z direction" and an opposite side of the starting point side is referred to as a "+Z direction" where appropriate, and furthermore, the "−Z direction" and the "+Z direction" are collectively referred to as a "Z direction" where appropriate. Note that, although it is assumed that the X, Y, and Z axes orthogonally intersect with one another in the description below, it is not necessarily the case that units included in the smartphone 3 serving as the mobile device M orthogonally intersect with one another.

FIG. 7 is a front view of the mobile device M according to the second embodiment. FIG. 8 is a back view of the mobile device M according to the second embodiment. FIG. 9 is a cross-sectional view of the mobile device M taken along a line IX to IX of FIG. 7 according to the second embodiment.

As illustrated in FIG. 7, the smartphone 3 serving as the mobile device M includes a case 300 and a display panel 310. Furthermore, as illustrated in FIG. 8, the smartphone 3 includes an accommodation section 400 accommodating a battery 20 which is an all-solid-state battery having solid electrolyte and a connection section 410 electrically coupled to the battery 20 accommodated in the accommodation section 400.

As illustrated in FIGS. 7 to 9, the case 300 includes wall sections 303, 304, and 306, that is, one surface of the case 300 is open. The wall section 306 faces the open surface which is an open side of the case 300. The wall section 303 is located in a portion in the +Y direction of the case 300. The wall section 304 is located in a portion in the −Y direction of the case 300. Furthermore, although not illustrated in FIGS. 7 to 9, the case 300 has wall sections facing each other in the X direction. Specifically, the case 300 has a substantially rectangular parallelepiped shape having the open surface.

Furthermore, in the case 300, the display panel 310 is disposed on the open surface facing the wall section 306 in the Z direction. The display panel 310 includes a display section 341 and a sensor section 342 laminated on the display section. Note that the section 341 is constituted by a liquid crystal panel, an electronic paper panel, or an organic electroluminescence panel. Furthermore, the sensor section 342 functions as an operation section which receives a user operation. Examples of the sensor section 342 include a resistive film sensor, an electrostatic capacitance sensor, and a surface acoustic wave sensor. That is, the display panel 310 of this embodiment is a so-called touch panel configured by integrating the display section 341 with the sensor section 342 corresponding to an operation switch.

As described above, the display panel 310, a driving unit Dry, and the accommodation section 400 are disposed on the case 300 of the smartphone 3 serving as a mobile device M according to the second embodiment.

Specifically, as illustrated in FIG. 9, the accommodation section 400 accommodating a fixed battery 20 is disposed such that the accommodation section 400 is in contact with an inner surface 306a of the wall section 306 of the case 300. Furthermore, an openable cover portion not illustrated may be disposed on the wall section 306 being in contact with the accommodation section 400. A circuit substrate 312 in which the driving unit Dry is implemented is positioned on the accommodation section 400 in the +Z direction and the display panel 310 is positioned on the circuit substrate 312 in the +Z direction.

Figure 10:
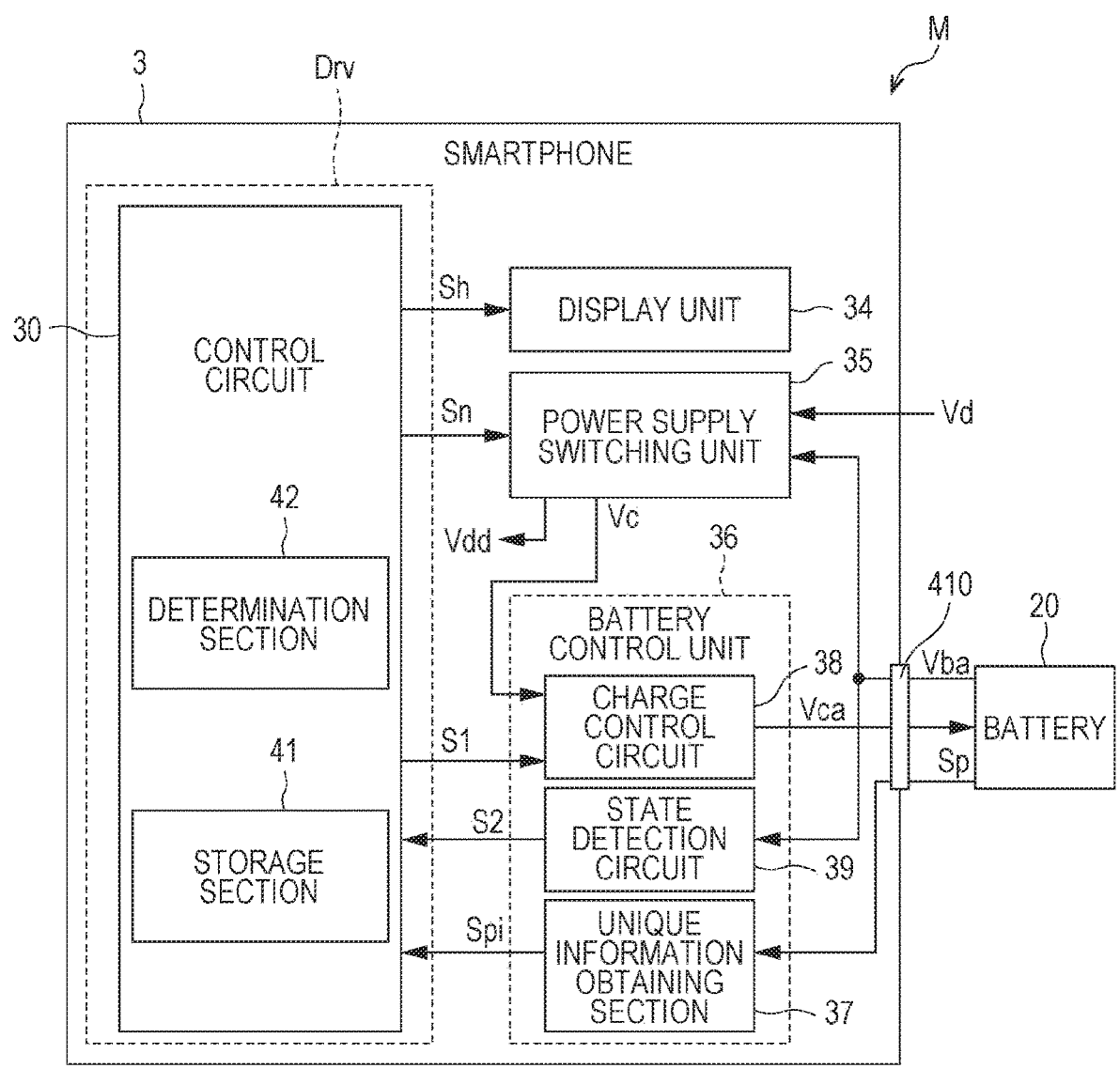
FIG. 10 is a diagram illustrating a functional configuration of the mobile device according to the second embodiment.

FIG. 10 is a diagram illustrating a functional configuration of the mobile device M according to the second embodiment. As illustrated in FIG. 10, the smartphone 3 serving as the mobile device M includes a control circuit 30, a display unit 34, a power supply switching unit 35, and a battery control unit 36.

The control circuit 30 which generates and outputs various control signals controlling driving of the smartphone 3 includes a CPU, for example. Note that the control circuit 30 may include at least one of a DSP, an ASIC, a PLD, and an FPGA instead of the CPU or in addition to the CPU.

The control circuit 30 generates a display control signal Sh for controlling display of various information in the display unit 34 and outputs the generated display control signal Sh to the display unit 34. The display unit 34 displays the various information including operation information and state information of the mobile device M in accordance with the display control signal Sh. By this, information including operation and states of the mobile device M is reported to the user. Here, the display unit 34 includes the display panel 310 described above. The display unit 34 is an example of a driving circuit according to the second embodiment.

Furthermore, the control circuit 30 generates a power source selection signal Sn for controlling selection of a supply source of a power source voltage to be supplied to the smartphone 3 and outputs the generated power source selection signal Sn to the power supply switching unit 35. A voltage Vb supplied from the battery 20 through a connection section 410 and a voltage Vd supplied from an AC adapter disposed outside the mobile device M through a DC jack 108 are supplied to the power supply switching unit 35. The power supply switching unit 35 selects one of the voltages Vb and Vd based on the power source selection signal Sn and supplies a selected one of the voltages Vb and Vd to the sections of the smartphone 3 as a voltage Vdd serving as a power source voltage of the smartphone 3. Furthermore, the power supply switching unit 35 generates a voltage Vc for charging the battery 20 based on a voltage Vd supplied from the AC adapter through the DC jack 108 and outputs the voltage Vc to the battery control unit 36.

Furthermore, the control circuit 30 generates a control signal S1 for controlling the battery control unit 36 and outputs the generated control signal S1 to the battery control unit 36. Furthermore, a state signal S2 and the unique information signal Spi are supplied from the battery control unit 36 to the control circuit 30.

The battery control unit 36 includes a charge control circuit 38 controlling charge of the battery 20, a state detection circuit 39 which detects a state of the battery 20 and which generates and outputs a state signal S2 indicating a result of the detection, and a unique information obtaining section 37 obtaining unique information of the battery 20. Although the battery 20 is disposed on an outside of the smartphone 3 in FIG. 10, the battery 20 is incorporated in the accommodation section 400 of the smartphone 3 in a detachable manner in practice.

The state detection circuit 39 detects a voltage value of the voltage Vb output from the battery 20, as a state of the battery 20, for example. By this, the state detection circuit 39 detects coupling between the connection section 410 and the battery 20. Then the state detection circuit 39 generates a state signal S2 indicating the state of the battery 20 in accordance with a result of the detection and outputs the state signal S2 to the control circuit 30.

The control circuit 30 generates a power source selection signal Sn based on the input state signal S2 and outputs the generated power source selection signal Sn to the power supply switching unit 35. By this, the power supply switching unit 35 may select the voltage Vb output from the battery 20. Thereafter, when the power supply switching unit 35 selects the voltage Vb based on the power source selection signal Sn and outputs the voltage Vdd, the smartphone 3 is driven by electric power based on the voltage Vb supplied from the battery 20.

Furthermore, the state detection circuit 39 detects a voltage value of the voltage Vb supplied from the battery 20 and a temperature of the battery 20, for example, as a state of the battery 20, generates a state signal S2 indicating the state of the battery 20 in accordance with a result of the detection, and outputs the state signal S2 to the control circuit 30. The control circuit 30 determines whether the battery 20 is to be charged with reference to the detected voltage value of the voltage Vb and the detected temperature of the battery 20, generates a control signal S1 in accordance with a result of the determination, and outputs the control signal S1 to the charge control circuit 38. Thereafter, the charge control circuit 38 determines whether a voltage Vc supplied from the power supply switching unit 35 is to be output as a voltage Vca used to charge the battery 20 based on the input control signal S1.

The unique information obtaining section 37 reads and obtains the unique information Sp stored in the battery 20. The unique information Sp stored in the battery 20 includes manufacturing information including a name of a manufacturer of the battery, a location of manufacture, and a manufacturing date, characteristic information including a nominal voltage and rating capacity, and charge/discharge characteristic information including a charge method, a charge voltage, and a discharge voltage. Such unique information is stored in a microchip, not illustrated, or the like mounted on the battery 20, for example. The unique information obtaining section 37 generates a unique information signal Spi based on the obtained unique information Sp and outputs the generated unique information signal Spi to the control circuit 30.

The determination section 42 included in the control circuit 30 compares the unique information signal Spi output from the unique information obtaining section 37 with the unique information data Dpi stored in the storage section 41. Subsequently, the control circuit 30 determines whether the battery 20 accommodated in the accommodation section 400 is suitable for use in the smartphone 3. Thereafter, the control circuit 30 controls driving of the sections included in the smartphone 3 based on a result of the determination.

Here, the charge control circuit 38 included in the battery control unit 36 has the same configuration as the charge control circuit 18 according to the first embodiment, the state detection circuit 39 has the same configuration as the state detection circuit 19 according to the first embodiment, and the unique information obtaining section 37 has the same configuration as the unique information obtaining section 17 according to the first embodiment. Therefore, detailed descriptions of the charge control circuit 38, the state detection circuit 39, and the unique information obtaining section 37 are omitted. Similarly, the control circuit 30 corresponds to the control circuit 10 according to the first embodiment, the storage section 41 included in the control circuit 30 has the same configuration as the storage section 21 according to the first embodiment, and the determination section 42 has the same configuration as the determination section 22 according to the first embodiment. Therefore, detailed descriptions of the storage section 41 and the determination section 42 are omitted.

The smartphone 3 serving as the mobile device M according to the second embodiment which is configured as described above may also attain effects the same as the effects of the mobile printer 1 serving as the mobile device M according to the first embodiment.

3. Other Embodiments

Although the portable mobile printer 1 is taken as an example of the mobile device M according to the first embodiment described above and the smartphone 3 is taken as an example of the mobile device M according to the second embodiment, the mobile device M is at least a portable device driven by a battery and may be a tablet terminal, a cellular phone, an electronic calculator, a digital audio player, and the like. Also in this case, effects the same as the effects of the first and second embodiments may be attained.

Furthermore, the normal mode and the restriction mode may have the following relationships. Specifically, when the mobile device M includes a mechanical force generation section, for example, a mechanical force in the restriction mode is smaller than a mechanical force in the normal mode. When the mobile device M includes a sound generation section, a volume of sound generated in the restriction mode is smaller than a volume of sound generated in the normal mode. When the mobile device M includes a light generation section, a quantity of light generated in the restriction mode is smaller than a quantity of light generated in the normal mode. When the mobile device M includes a temperature changing section, a temperature change amount in the restriction mode is smaller than a temperature change amount in the normal mode.

Although the embodiments and the modifications are described hereinabove, the present disclosure is not limited to these embodiments, and various modifications may be made without departing from the scope of the disclosure. For example, the foregoing embodiments may be appropriately combined.

The present disclosure includes configurations substantially the same as the configurations described in the foregoing embodiments (for example, configurations having the same functions, the same methods, and the same results or configurations having the same purpose and the same effects). Furthermore, the present disclosure includes configurations in which unimportant portions of the configurations described in the foregoing embodiments are replaced. Moreover, the present disclosure includes configurations which may attain the same effects as the configurations described in the foregoing embodiments and configurations which may attain the same purposes as the configurations described in the foregoing embodiments. In addition, the present disclosure includes configurations obtained by adding general techniques to the configurations described in the foregoing embodiments.

What is claimed is:

1. A mobile device driven based on electric power, comprising:
   a connection section configured to be electrically coupled to an all-solid-state battery having a solid electrolyte;
   an obtaining section configured to obtain unique information of the all-solid-state battery electrically coupled to the connection section, the unique information including a name of a manufacture and a manufacturing date for the all-solid state battery;
   a driving circuit configured to be driven based on electric power supplied from the all-solid-state battery coupled to the connection section; and
   a control circuit configured to control driving of the driving circuit, the control circuit including a storage section configured to store unique information data corresponding to the unique information obtained by the obtaining section, wherein upon determining that the unique information data corresponding to the unique information obtained by the obtaining section are unsaved unique information data that have not been stored in the storage section, the control circuit is configured to perform control such that the driving circuit is not driven, and the control circuit is configured to store, in the storage section, the unique information data that are determined as the unsaved unique information data.

2. The mobile device according to claim 1,
wherein, when the unique information obtained by the obtaining section is first unique information indicating a first battery serving as the all-solid-state battery, the control circuit performs control such that the driving circuit is driven in a first driving state, and
wherein, when the unique information obtained by the obtaining section is second unique information indicating a second battery serving as the all-solid-state battery, the control circuit performs control such that the driving circuit is driven in a second driving state different from the first driving state.

3. The mobile device according to claim 2,
wherein performance of the second battery is lower than performance of the first battery, and
wherein power consumption in the second driving state is smaller than power consumption in the first driving state.

4. The mobile device according to claim 2,
wherein, upon further determining that the unique information obtained by the obtaining section is different from the first unique information or the second unique information, the control circuit performs control such that the driving circuit is not driven and stores, in the storage section, the unique information data that are determined as the unsaved unique information data.

5. The mobile device according to claim 2,
wherein the driving circuit includes a mechanical force generation section operating or displacing an object, and
wherein a mechanical force generated in the second driving state is smaller than a mechanical force generated in the first driving state.

6. The mobile device according to claim 2,
wherein the driving circuit includes a sound generation section generating sound, and
wherein a volume of sound generated in the second driving state is smaller than a volume of sound generated in the first driving state.

7. The mobile device according to claim 2,
wherein the driving circuit includes a light generation section generating light, and
wherein a quantity of light generated in the second driving state is smaller than a quantity of light generated in the first driving state.

8. The mobile device according to claim 2,
wherein the driving circuit includes a temperature changing section changing a temperature, and
wherein a temperature change amount in the second driving state is smaller than a temperature change amount in the first driving state.

9. The mobile device according to claim 1, further comprising:
a determination section configured to determine a type of the all-solid-state battery coupled to the connection section based on the unique information obtained by the obtaining section and the unique information data.

10. The mobile device according to claim 1, wherein
the storage section is configured to store, as the unique information data, a name of a manufacturer and a manufacturing year for each of all-solid-state batteries, in a state in which the name of a manufacturer and the manufacturing year are associated with a type of each of the all-solid-state batteries.

* * * * *